H. F. QUICKEL.
VALVE.
APPLICATION FILED NOV. 24, 1909.
974,185.
Patented Nov. 1, 1910.
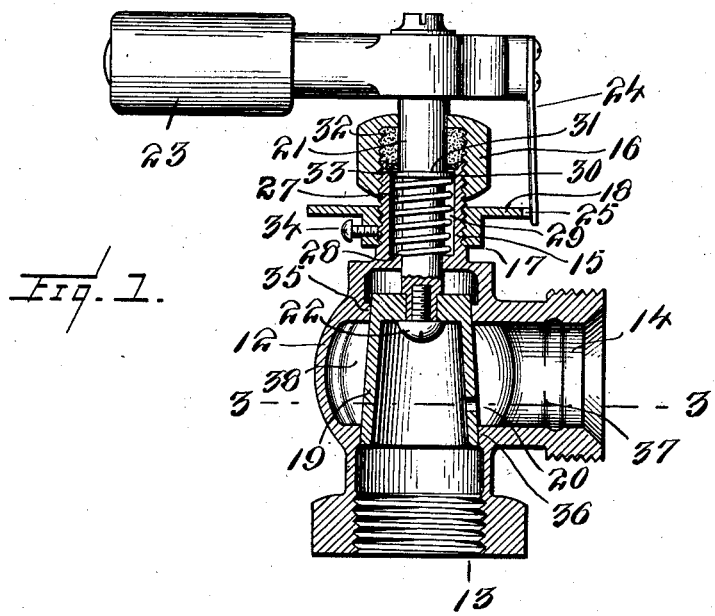
Fig. 1.
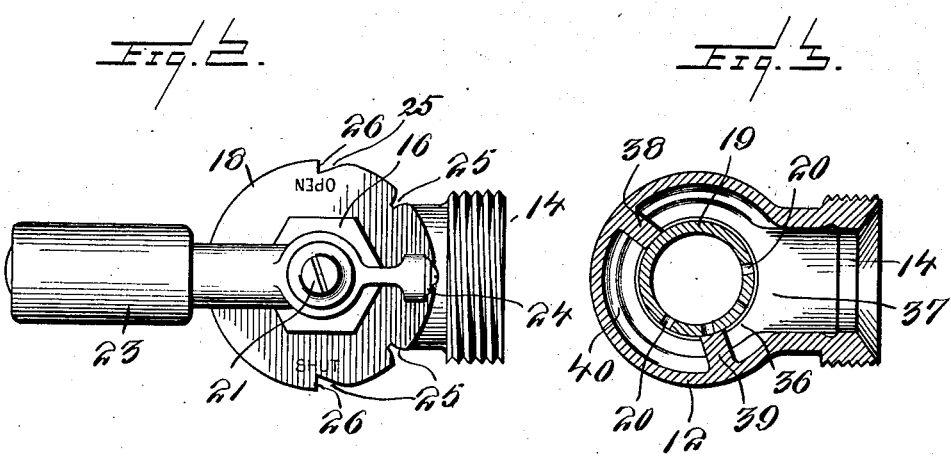
Fig. 2.    Fig. 3.
Fig. 4.
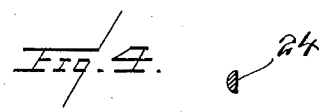
WITNESSES:
INVENTOR:
Henry F. Quickel
BY
Attorneys.

UNITED STATES PATENT OFFICE.

HENRY F. QUICKEL, OF HARRISBURG, PENNSYLVANIA.

VALVE.

974,185.   Specification of Letters Patent.   Patented Nov. 1, 1910.

Application filed November 24, 1909. Serial No. 529,724.

*To all whom it may concern:*

Be it known that I, HENRY F. QUICKEL, a citizen of the United States, residing at Harrisburg, in the county of Dauphin and State of Pennsylvania, have invented or discovered certain new and useful Improvements in Valves, of which the following is a specification, reference being had therein to the accompanying drawings.

This invention has for its object to provide a valve, for use in connection with steam or hot water radiators, which is of such construction that the amount of heating fluid passing through the valve may be accurately regulated, while the valve-operating device is of such construction as to provide for a convenient adjustment of the valve, as also to provide means whereby the regulating device may be retained in any desired position, but may be readily adjusted.

In the accompanying drawings, Figure 1 is a vertical section of the improved valve. Fig. 2 is a plan view thereof. Fig. 3 is a horizontal section on line 3—3, Fig. 1, and Fig. 4 is a detail cross section of the spring detent.

Referring to the drawings, the valve casing comprises the hollow body 12 having an inlet portion 13 and an outlet portion 14, said inlet and outlet portions being threaded for the proper attachment of the valve connections. The body 12 is provided with an upwardly projecting hollow stem or extension 15 which is screw threaded exteriorly for the reception of the packing nut 16 and for the threaded hub portion 17 of an indicating and retaining disk 18.

The valve plug 19, which is seated within the chamber of the body 12, consists of a hollow tapering thimble or body open at its bottom and having a semi-circular series of spaced outlet openings 20 in one half of its circumference, the other half of the circumference of the valve plug being imperforate. As herein shown the circumferentially spaced outlet openings eacn consists of a single hole, but two or more holes for each circumferentially spaced outlet may be provided, if desired. Rigidly attached to the valve plug is an operating spindle or stem 21 which is preferably formed square at its lower end so as to fit in a corresponding aperture in the top of the said valve plug, the parts being secured together by a screw 22. The said valve stem extends upward through the threaded stem 15 and is provided at its upper end with an operating handle 23 which is rigidly attached to the said valve stem and which is provided with a downwardly-extending spring detent 24 adapted to engage a series of notches 25 formed in the indicating and retaining disk 18.

The end notches of the series are provided with abrupt shoulders 26, so that when the detent 24 comes in contact with said shoulders the further movement of the handle, in closing or opening the valve, will be arrested. Owing, however, to the resilience of the detent 24 it may be moved out of the retaining notches between the stop shoulders 26 simply by shifting the handle 23 horizontally by applying a little force thereto, sufficient to spring the detent 24 out of any notch in which it may be resting. To facilitate this adjustment the spring detent 24 preferably has a rounded inner face, as shown in Fig. 4.

The number of notches between the notch which corresponds to the closed or "shut" position of the valve and the notch which corresponds to the "open" position of the valve will preferably correspond to the number of spaced outlet apertures in the valve plug, so that the valve may be opened more or less by graduated steps which will be clearly indicated by the position of the operating handle and its attached detent 24 relative to the disk 18.

The conical hollow valve is held to its seat by a spring 27 encircling the valve stem 21 and which spring is interposed between a shoulder 28 at the lower end of the chamber 29 in the casing stem 15 and a washer 30 placed on the valve stem 21 in contact with a shoulder 31 formed on said valve stem.

The packing nut 16 is provided with a recess for the reception of a suitable packing 32 which surrounds the upper portion of the valve stem beneath the handle 33, and which packing serves as a gland to form a tight joint at this point, the packing being preferably compressed in this recess or chamber in said nut by the aid of a washer 33 seated in the upper end of the threaded stem 15.

The retaining and indicating disk 18 may be screwed up and down on the stem 15, or may be turned on said stem to bring it to any desired position of adjustment relative to the detent 24, and said disk is retained in place, after proper adjustment, by a set screw 34 tapped in the hub 17 of said disk.

The hollow body 12, in which the upwardly tapering valve plug is seated, is provided with circular inwardly projecting flanges 35 and 36 which are, respectively, about on a level with the top and bottom of the outlet port 37 extending through the outlet portion 14 of said body. The said circular flanges afford seating parts for the top and bottom portions of the valve plug and serve as horizontal divisions for the chamber of the valve body. Between said horizontal circular flanges extend two vertical webs 38 and 39 which form vertical divisions for the chamber of the valve, one of said divisions communicating with the said outlet port 37 while the other of said divisions is closed; so that when the valve plug is turned so that all of its openings are in communication with the closed chamber or division 40 the valve will be shut, as will be understood.

From the foregoing it will be apparent that the invention provides a conveniently operated valve which may be opened or closed more or less for the purpose of regulating the flow of the fluid passing therethrough, and which will be reliably retained in any desired position of adjustment by reason of the spring detent with which the operating handle is provided, and which detent engages with notches in the retaining disk in such a manner that it may be readily moved from one notch to another, while the position of said detent relative to the "shut" or "open" notches of the retaining disk 18 will indicate the more or less opened or closed positions of the valve.

Having thus described my invention I claim and desire to secure by Letters Patent:

1. In a valve, the combination with a hollow body provided with inlet and outlet passages and with an upwardly-projecting, externally-threaded, hollow extension, of a valve seated in said body and comprising a hollow, tapering rotatable plug open at its bottom and provided with spaced apertures adapted to be brought into register with the said outlet passage, a valve-stem rigidly attached to said valve and extending upward through said hollow, externally-threaded extension, said valve-stem being provided at its upper end with a handle having a depending spring detent, a spring encircling said valve-stem and serving to yieldingly hold the valve to its seat, a gland nut on the upper end of said threaded extension, and a retaining and indicating disk also mounted on said threaded extension and provided with a series of notches engaged by said spring detent.

2. In a valve, the combination with a hollow body provided with inlet and outlet passages and with an upwardly-projecting, externally-threaded, hollow extension, of a valve seated in said body and comprising a hollow, tapering rotatable plug open at its bottom and provided with spaced apertures adapted to be brought into register with the said outlet passage, a valve-stem rigidly attached to said valve and extending upward through said hollow, externally-threaded extension, said valve-stem being provided at its upper end with a handle having a depending spring detent the inner face of which is rounded, a spring encircling said valve-stem and serving to yieldingly hold the valve to its seat, a gland nut on the upper end of said threaded extension, and an adjustable, retaining and indicating disk also mounted on said threaded extension and provided with a series of notches engaged by said spring detent.

3. In a valve, the combination with a hollow body provided with inlet and outlet passages and with an upwardly-projecting, externally-threaded, hollow extension, of a valve seated in said body and comprising a hollow, tapering rotatable plug open at its bottom and provided with spaced apertures adapted to be brought into register with the said outlet passage, a valve-stem rigidly attached to said valve and extending upward through said hollow, externally-threaded extension, said valve-stem being provided at its upper end with a handle having a depending spring detent, a spring encircling said valve-stem and serving to yieldingly hold the valve to its seat, a gland nut on the upper end of said threaded extension, and an adjustable retaining and indicating disk also mounted on said threaded extension and provided with a series of notches engaged by said spring detent, said disk being screw-threaded to engage said threaded extension and having a hub portion provided with a set-screw.

4. In a valve, the combination with a hollow body provided with inlet and outlet passages and with an upwardly-projecting, externally-threaded, hollow extension, of a valve seated in said body and comprising a hollow, tapering rotatable plug open at its bottom and provided with spaced apertures adapted to be brought into register with the said outlet passage, a valve-stem rigidly attached to said valve and extending upward through said hollow, externally threaded extension, said valve-stem being provided at its upper end with a handle having a depending spring detent, a spring encircling said valve-stem and serving to yieldingly hold the valve to its seat, a gland nut on the upper end of said threaded extension, and a retaining and indicating disk also mounted on said threaded extension and provided with a series of notches engaged by said spring detent, the end notches of the series having abrupt shoulders to be engaged by said detent to limit the movement of the said handle and thus arrest the turning movements of the valve plug.

In testimony whereof I affix my signature, in presence of two witnesses.

HENRY F. QUICKEL.

Witnesses:
 FRANK E. ZIEGLER,
 EDWARD M. WINTERS.